(12) United States Patent
Spratte et al.

(10) Patent No.: US 7,643,944 B2
(45) Date of Patent: Jan. 5, 2010

(54) MEASURING DEVICE FOR A MOTOR VEHICLE

(75) Inventors: Joachim Spratte, Osnabrück (DE); Michael Klank, Osnabrück (DE); Klaus Warnken, Bremen (DE); Alfons Noe, Hüde (DE); Günter Gödert, Trier (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 159 days.

(21) Appl. No.: 11/996,156

(22) PCT Filed: Jul. 5, 2006

(86) PCT No.: PCT/DE2006/001164

§ 371 (c)(1),
(2), (4) Date: Jan. 18, 2008

(87) PCT Pub. No.: WO2007/009422

PCT Pub. Date: Jan. 25, 2007

(65) Prior Publication Data

US 2008/0184577 A1 Aug. 7, 2008

(30) Foreign Application Priority Data

Jul. 19, 2005 (DE) .................. 10 2005 034 149

(51) Int. Cl.
*G01M 17/00* (2006.01)
*G01B 7/30* (2006.01)
(52) U.S. Cl. .................. 702/34; 33/534; 33/600; 73/787; 340/438; 340/686.3; 701/29

(58) Field of Classification Search .................. 33/534, 33/600; 73/787; 340/438, 686.3; 702/34; 701/29
See application file for complete search history.

(56) References Cited

U.S. PATENT DOCUMENTS

| 4,222,266 A * | 9/1980 | Theodoulou | 73/179 |
| 5,696,676 A * | 12/1997 | Takaba | 701/31 |
| 6,175,787 B1 * | 1/2001 | Breed | 701/29 |
| 7,171,330 B2 * | 1/2007 | Kruse et al. | 702/151 |
| 2002/0087238 A1 * | 7/2002 | Matsui | 701/33 |
| 2005/0125117 A1 * | 6/2005 | Breed | 701/29 |
| 2006/0116799 A1 * | 6/2006 | Mahlo | 701/29 |
| 2008/0129475 A1 * | 6/2008 | Breed et al. | 340/438 |
| 2008/0284575 A1 * | 11/2008 | Breed | 340/438 |
| 2009/0051135 A1 * | 2/2009 | Lohmuller et al. | 280/124.1 |

FOREIGN PATENT DOCUMENTS

| DE | 37 21 682 A1 | 4/1988 |
| DE | 690 31 987 T2 | 4/1998 |

(Continued)

*Primary Examiner*—Christopher W Fulton
(74) *Attorney, Agent, or Firm*—McGlew and Tuttle, P.C.

(57) ABSTRACT

A measuring device is provided for a motor vehicle, with a bracket (1), with a joint (8), which is connected to the bracket (1) and which has a joint housing (20) and a pivot pin (19) mounted movably in same. A component (2) is provided which is connected to the joint (8) and which is mounted pivotably on the bracket (1) via the joint (8). An angle measuring device (17, 18) is provided, by which the angle (φ) of the component (2) in relation to the bracket (1) can be determined. An analyzer (23) is connected to the angle measuring device (17, 18) and has a double differentiator (24), which is connected to the angle measuring device (17, 18) and which is followed downstream by a summer or integrator (26) via the intermediary of a calculating unit (25).

14 Claims, 4 Drawing Sheets

FOREIGN PATENT DOCUMENTS

| | | |
|---|---|---|
| DE | 299 06 983 U1 | 10/2000 |
| DE | 101 35 362 C1 | 10/2002 |
| DE | 102 47 993 A1 | 4/2004 |
| EP | 0 471 286 A1 | 2/1992 |
| EP | 0 937 615 A2 | 8/1999 |
| EP | 1 482 189 | 12/2004 |

* cited by examiner

MEASURING DEVICE FOR A MOTOR VEHICLE

CROSS REFERENCE TO RELATED APPLICATIONS

This application is a U.S. National Phase application of International Application PCT/DE 2006/001164 and claims the benefit of priority under 35 U.S.C. § 119 of German Patent Application DE 10 2005 034 149.7 filed Jul. 19, 2005, the entire contents of which are incorporated herein by reference.

FIELD OF THE INVENTION

The present invention pertains to a measuring device for a motor vehicle, with a bracket, with a joint, which is connected to the bracket and which has a joint housing and a pivot pin mounted movably in same, with a component, which is connected to the joint and which is mounted pivotably via the joint at the bracket, with an angle measuring device, by means of which the angle of the component in relation to the bracket can be determined; and with an analyzer connected to the angle measuring device. The present invention pertains, furthermore, to a process for determining a fatigue value characterizing the fatigue of a motor vehicle component mounted pivotably on a bracket.

BACKGROUND OF THE INVENTION

The continuous action of forces and/or torques (hereinafter also called forces) on heavily stressed components of a motor vehicle may lead to material fatigue and, after a certain time, to rupture of these components. A fatigue recognition system could warn the driver before rupture of components of the motor vehicle. Furthermore, it is desirable to detect excessive stresses of the vehicle or components caused by the driver. To embody a reliable fatigue recognition, it is necessary to determine the forces acting on the components as accurately as possible. One possibility is the use of wire strain gauges. However, strong temperature dependence of the precision resistors, the decreasing adhesion of the adhesive as well as the encapsulation of the wire strain gauges against stone chips are problematic.

SUMMARY OF THE INVENTION

The object of the present invention is to embody a measurement of the fatigue or wear of a highly stressed component in a motor vehicle without the use of wire strain gauges.

The measuring device according to the present invention for a motor vehicle has a bracket; a joint, which is connected to the bracket and which comprises a joint housing and a pivot pin mounted pivotably in same; a component, which is connected to the joint and which is mounted pivotably on the bracket via the joint; an angle measuring device, by means of which the angle of the component in relation to the bracket can be determined, and an analyzer, which is connected to the angle measuring device, wherein the analyzer comprises a double differentiator, which is connected to the angle measuring device and which is followed by a summer or integrator via the intermediary of a calculating unit.

Using the measuring device according to the present invention, it is possible to determine the fatigue or the wear of the component with sufficient accuracy. Since the component regularly pivots in relation to the bracket during the travel of the vehicle and the pivoting can be described by the angle between the component and the bracket, a double differentiation of this angle according to the time yields an indicator of the acceleration, to which the component is subjected. However, this acceleration is also an indicator of the force acting on the component.

Since it is irrelevant for fatigue whether the acting forces increase or decrease (brake) the velocity of the component, a sign-free acceleration or force value, which can be determined anew continuously or at discrete time intervals, is preferably determined by the calculating unit, and the sign-free acceleration or force values are summed up or integrated over time.

The value formed by the summer or integrator is subsequently called the fatigue value and it characterizes the fatigue of the component to an extent sufficient for practical applications in a motor vehicle. Since a certain fatigue is regularly permissible for components in a motor vehicle, a threshold value transducer, whose output is activated or deactivated only when the fatigue value exceeds a preset threshold value, is arranged downstream of the summer or integrator. This threshold value is component-dependent and characterizes the maximum allowable fatigue for the particular component.

A load profile may also be determined for the joint and/or for the component in advance, determining the number of loadings, vibrations and/or tilting or rotary motions that the joint and/or component can perform at what load and at what frequency. A limit value, at which the joint and/or component is considered to have fatigued or worn can be determined from this. The threshold value can then be formed on the basis of this limit value or it may be formed by same.

The threshold value transducer may be connected to a vehicle control. However, a signal transmitter, which can be actuated by the threshold value transducer and which informs the driver that the threshold value has been exceeded, is preferably arranged downstream of the threshold value transducer. The signal transmitter may be designed, e.g., as an audio or visual signal transmitter and is preferably arranged in the passenger compartment of the motor vehicle.

In order to prevent the fatigue value determined until a failure of the energy supply for the analyzer from being lost in case of a failure of the power supply for the analyzer, the summer or integrator may have a memory. This memory may be supplied with energy from an additional battery and/or designed as a nonvolatile memory, which keeps the fatigue value stored even in case of failure of the energy supply.

The double differentiator, the calculating unit and/or the summer or integrator may be designed as analog or digital assembly units. However, the double differentiator, the calculating unit and/or the summer or integrator are preferably formed by at least one digital computer or by a program running in same. This has the advantage that a computer already present in the motor vehicle can be used as an analyzer by means of suitable software, so that only low extra costs are incurred. The double differentiator, the calculating unit and/or the summer or integrator can now be embodied numerically by means of a software. The sampling frequency of the double differentiator is, in particular, higher than the sampling frequency of the summer or integrator, which is preferably on the order of magnitude of approx. 1 Hz. However, the sampling frequency of the double differentiator is especially at least 2 to 3 times the sampling frequency of the summer or integrator.

The values of the accelerations or forces, which act on the component, can be summed up or integrated over time as the fatigue value. This is sufficient for many applications, so that especially the (absolute) value of the measured value differentiated twice according to the time is formed by the calculating unit as the sign-free acceleration or force value. Thus, the calculating unit has an absolute value former, which may be designed, e.g., as a full-wave rectifier or may be formed by the digital computer.

To achieve greater accuracy for the determination of the fatigue value, it is possible to take into account the fact that forces of different intensities affect the fatigue of the component with different intensities. Forces below a certain limit may not practically lead to any fatigue, whereas forces above a certain limit may lead to an immediate total failure. The dependence describing how rapidly certain forces lead to failure is described by a function or characteristic, which can also be called a stress number curve. The force or acceleration or the value of the force or acceleration can be transferred as a value to this function, so that its function value can be determined. In addition, the product of the function value times the value transferred to the function for the determination of the function value can be determined. The function value and/or the product may be determined anew continuously or at discrete time intervals, the determined function values or products or the absolute values of the function values or products being summed up or integrated over time. The function may be embodied by the calculating unit or implemented by means of same. In particular, the calculating unit has for this a functional unit embodying or implementing the function. Furthermore, the calculating unit may comprise an absolute value former. In particular, the above-mentioned product can be additionally determined by the calculating unit, so that the calculating unit preferably has a multiplier. The product is especially a sign-free value, so that the absolute value former may be eliminated.

The component may be designed as a chassis component, which is subjected to especially high loads in the motor vehicle. In particular, the component is a chassis control arm, e.g., an upper or lower suspension arm. Since motor vehicle control arms are used as connection means between a vehicle body and a wheel carrier, the bracket is preferably formed from the vehicle body or from a wheel carrier of the motor vehicle.

Elastomer bearings or spherical joints, which may form the joint, are used in chassis of motor vehicles. A spherical joint shall be defined here as an elastomer or rubber joint, which is movable in the same directions in space as a ball and socket joint. The joint may have an inner part and an outer part for this, the inner part being arranged in the outer part via the intermediary of an elastomer body. However, the joint is, in particular, a ball and socket joint, the pivot pin or ball pivot being mounted rotatably and pivotably in the joint housing. This mounting may be performed via the intermediary of a ball shell.

The angle measuring device is preferably integrated in the joint, so that it is protected from external effects by the joint housing. Furthermore, a magnetic measurement method has proved to be especially insensitive to disturbances for the angle measuring device, so that the angle measuring device preferably has a magnet and a magnetic field-sensitive sensor cooperating with same. The magnet may be arranged at or in the pivot pin and the magnetic field-sensitive sensor at or in the joint housing. The angle measuring device measures, in particular, the angle that the pivot pin assumes relative to the joint housing, because this angle also characterizes the angle that the component assumes relative to the bracket.

The angle between the component and the bracket is thus measured at least indirectly.

The idea of the invention also covers a motor vehicle with a vehicle body, with a wheel suspension having a motor vehicle component, and with at least one measuring device according to the present invention, which may be varied according to all the above-mentioned embodiments.

The present invention pertains, furthermore, to a process for determining a fatigue value characterizing the fatigue of a motor vehicle component mounted pivotably on a bracket and the use of the measuring device according to the present invention for determining a fatigue value characterizing the fatigue of the component by
    determining angle data by the consecutive measurement of the angle between the component and the bracket,
    determining acceleration data by double differentiation of the angle data according to the time,
    determining sign-free force data on the basis of the acceleration data, and
    determining the fatigue value by summing up or integrating the sign-free force data over time.

The measuring device may be varied according to all the aforementioned embodiments. The term "data" shall refer to the preferred use of a digital computer as an analyzer. However, it is possible for the term "data" to designate one or more values that are available as analog or digital signals, without a computer being used.

The sign-free force data can be determined by forming the absolute value of the acceleration data. In addition or as an alternative, the sign-free force data may be determined on the basis of a function or characteristic, which is called especially a stress-number curve. The function or characteristic may be determined from the load profile determined in advance. The acceleration data or their absolute values or force data formed from the acceleration data or the absolute values thereof can thus be transferred to the function as a value and the function value thereof can be determined. The sign-free force data can then be determined on the basis of the function values. In particular, each function value is multiplied by the value that has been transferred to the function to determine this function value for determining the sign-free force data.

It is possible, in principle, to modify the angle, the angle data, the acceleration data, the sign-free force data as well as the fatigue value with suitable factors. For example, additional assembly units, which take into account especially form factors or proportionality constants, may be connected between the angle measuring device and the analyzer, between the double differentiator and the analyzer, between the double differentiator and the calculating unit, between the calculating unit and the summer or integrator and/or after the summer or integrator. If the analyzer is formed by a digital computer, these additional assembly units may also be embodied by means of the digital computer. Only a modification of the software is necessary for this. In particular, the motions (angles), frequencies and/or loads of the joint are recorded during the operation of the motor vehicle and stored in a long-term memory provided, e.g., in the analyzer. Furthermore, the load profile determined in advance may be stored in this long-term memory or in another memory of the analyzer and compared with the data recorded during the operation and stored in the long-term memory, so that a warning signal can be sent when the limit value is exceeded. The calculating unit or the functional unit may have, e.g., the memory with the load profile being stored therein and generate and send an output value on the basis of the load profile or the characteristic as a function of an input value supplied to the calculating unit or functional unit. The analysis of the angle data, which are preferably determined continuously or quasi-continuously, does not have to take place in real time, but it may be performed with a time delay. However, this time delay is, in particular, small enough for the worn or fatigued state of the joint to be still able to be discovered in time.

The force in chassis components can be determined indirectly via the acceleration of these parts during driving. The angle sensor, which may be integrated especially in the ball and socket joint, is suitable for measuring the acceleration. The angle sensor measures in this case the angle that the pivot pin assumes in relation to the housing and thus also represents the position of, e.g., an upper and lower suspension arm as well as of a wheel carrier. The acceleration in the chassis component, which is proportional to the force, can be calculated by the double numeric differentiation of the angle data. For example, the absolute value and/or the above-mentioned product are/is formed from these forces or accelerations, after which the sign-free forces or accelerations are summed up and thus they furnish information on the loads occurring in the chassis. The angle measuring device may now be designed such that it is integrated with the analyzer. The point in time beginning from which a component has reached or exceeded the fatigue limit can be determined from the loads determined.

In addition, transfer functions between angle and failure-relevant force can be calculated from existing multi-body models and/or measured data from prototype phases, and the transfer functions can be embodied or implemented by means of the calculating unit or the functional unit. The transfer functions may be formulated, e.g., in the time range or in the frequency range. However, the present invention is independent from the mathematical model being used. Since the double time derivation of the angles or angle data characterizes the acceleration of the component and hence also the force acting on same, a direct or indirect double differentiation of the angles or angle data according to the time is always performed, independently from whether, e.g., the differentiation is described by a multiplication in the frequency range or numerically by differentiation and quotient formation in the time range.

Temperatures ranging from −40° C. to +125° C. occur in the chassis, and the measuring device according to the present invention leads to a marked improvement of accuracy compared to the use of wire strain gauges.

The present invention will be described below on the basis of a preferred embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
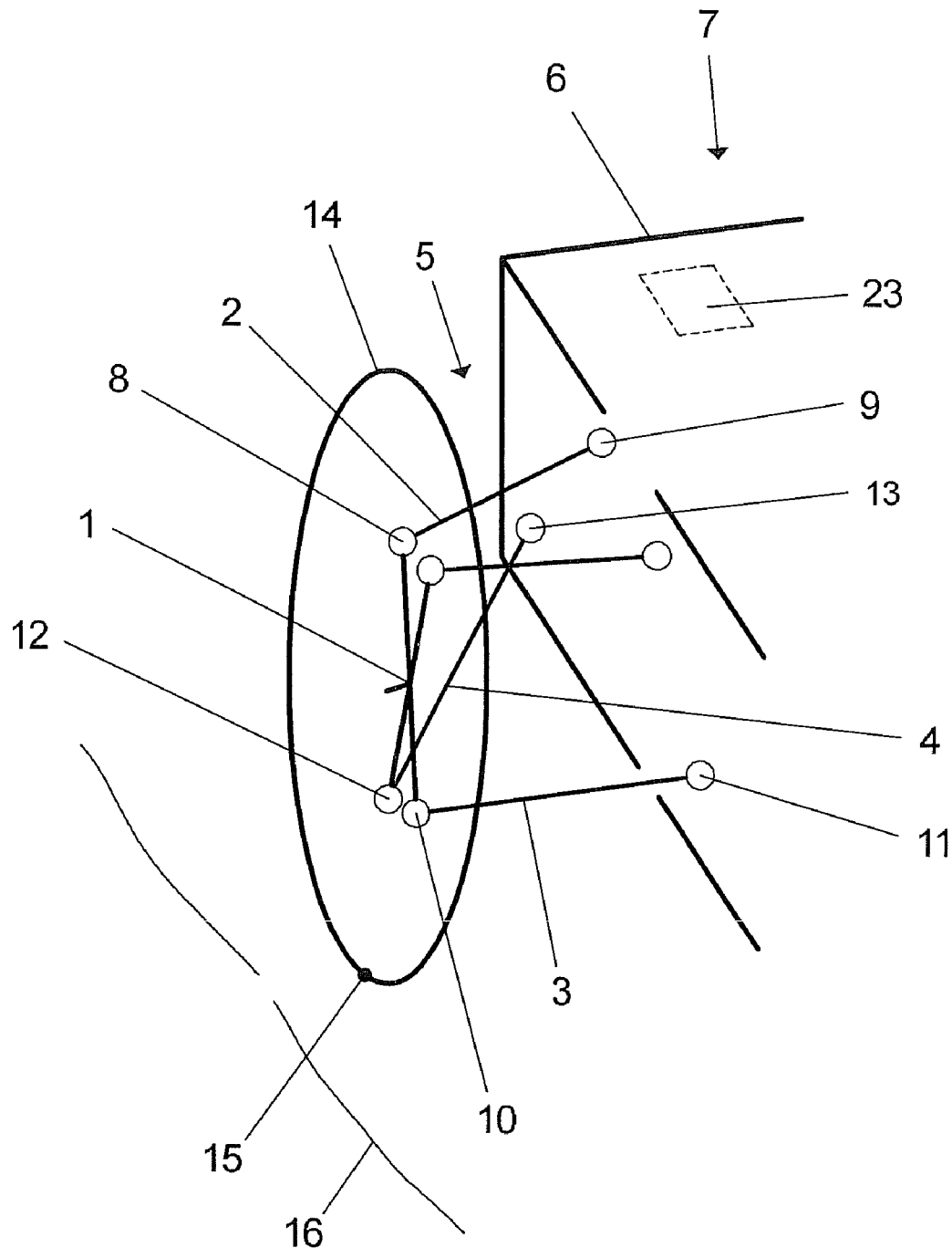
FIG. 1 is a schematic view of a wheel suspension of a motor vehicle with an embodiment of the measuring device according to the present invention.

Referring to the drawings in particular, FIG. 1 shows a schematic view of a wheel suspension 5, wherein a wheel carrier 1 is connected to a vehicle body 6 of a motor vehicle 7 shown partially via an upper suspension arm 2, a lower suspension arm 3 and a radius arm 4. The upper suspension arm 2 is connected to the wheel carrier 1 via a ball and socket joint 8 and to the vehicle body 6 via a spherical joint 9. The lower suspension arm 3 is connected to the wheel carrier 1 via a ball and socket joint 10 and to the vehicle body 6 via an elastomer bearing 11. Furthermore, the radius arm 4 is connected to the wheel carrier 1 via a ball and socket joint 12 and to the vehicle body 6 via an elastomer bearing 13. A tire or wheel 14, which is in contact with a road surface 16, shown schematically in a wheel contact point 15, is mounted rotatably on the wheel carrier 1.

Figure 2:
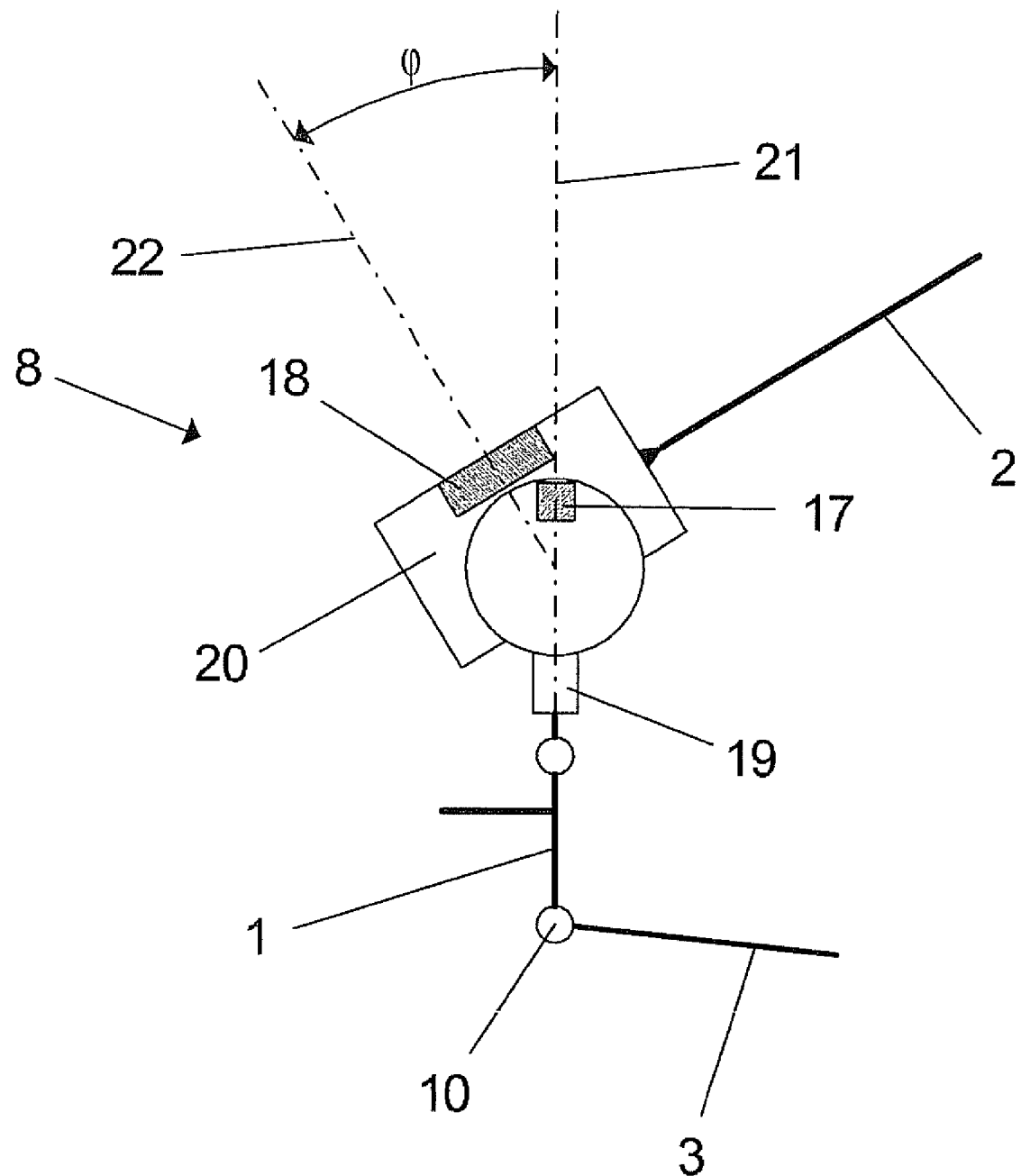
FIG. 2 is a schematic view of a ball and socket joint according to FIG. 1 with integrated angle measuring device.

FIG. 2 shows a schematic view of the ball and socket joint 8, in which an angle measuring device having a magnet 17 and a magnetic field-sensitive sensor 18 is integrated. The magnetic field-sensitive sensor 18 is arranged in the housing 20 of the ball and socket joint 8, whereas the magnet 17 is seated in the ball pivot 19 of the ball and socket joint 8, which [said ball pivot] is mounted rotatably and pivotably in the ball and socket joint housing 20. The ball and socket joint housing 20 is rigidly connected to the upper suspension arm 2, whereas the ball pivot 19 is fixed to the wheel carrier 1.

Wear measurement for the upper suspension arm 2 is possible with the wheel suspension shown in FIGS. 1 and 2. In addition or as an alternative, it is possible to also carry out such a measurement for one or more of the other control arms of the wheel suspension.

The angle φ shown in FIG. 2 characterizes the pivoting between the longitudinal axis 21 of the ball pivot 19 and the longitudinal axis 22 of the ball and socket joint housing 20. This angle φ also describes the pivoting of the upper suspension arm 2 relative to the wheel carrier 1 or to the vehicle body 6 and is determined by means of the angle measuring device. The angle measuring device or the magnetic field-sensitive sensor 18 is connected here to an analyzer 23, which is shown in FIG. 1 and is arranged in the vehicle body 6. As an alternative or in addition, it is possible for the measured angle to represent the twisting of the ball pivot 19 in relation to the joint housing 20 about its longitudinal axis 21, because this angle can characterize the pivoting of the upper suspension arm 2 in case of another installation position of the joint 8.

Figure 3:
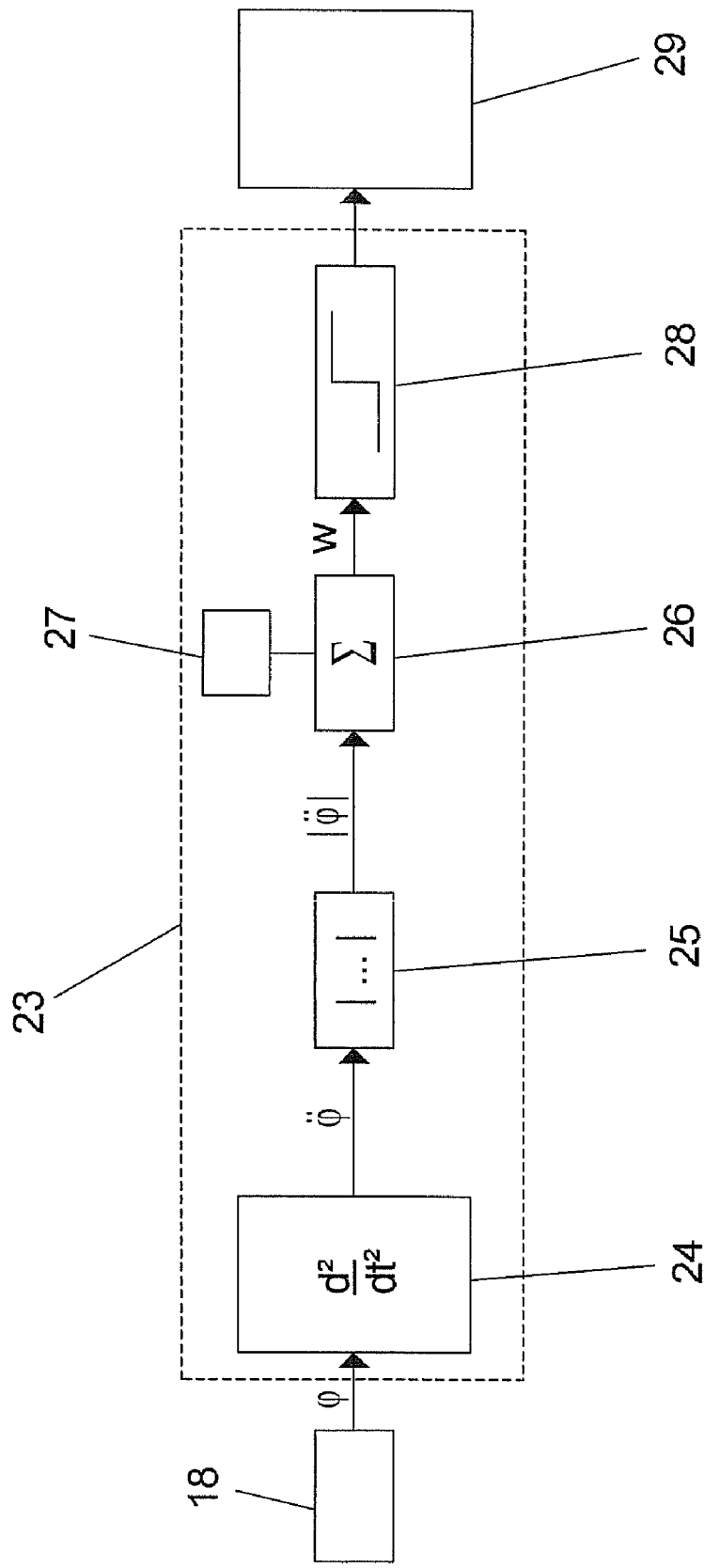
FIG. 3 is a schematic block diagram of the analyzer according to FIG. 1.

FIG. 3 shows a schematic block diagram of the analyzer 23 formed by a digital computer, where the magnetic field-sensitive sensor 18 supplying a value representing the angle φ is connected to a double differentiator 24. This [differentiator] samples the output of the magnetic field-sensitive sensor 18 at a first sampling frequency and supplies a value $\ddot{\varphi}$, which is differentiated twice according to the time and is sent to a calculating unit 25, which is designed as a absolute value former and which forms the absolute value of $\ddot{\varphi}$. The output value $|\ddot{\varphi}|$ of the calculating unit 25 is sampled by a summer 26 at a second sampling frequency, which is lower than the first sampling frequency. The absolute value $|\ddot{\varphi}|$ forms a sign-free force signal or sign-free force data. The summer 26 sums up the sampled values and sends as an output signal the calculated sum w, which characterizes the wear of the suspension arm 2. The summer 26 has a memory 27, which keeps stored the sum or the wear value w even in case of failure of the energy supply. The value w is sent to a threshold value transducer 28, and when a preset threshold value is exceeded, the threshold value transducer 28 activates a signal transmitter 29, which is preferably designed as a light, which is arranged in the passenger compartment of the vehicle and which optically informs the driver that the threshold value has been exceeded.

Figure 4:
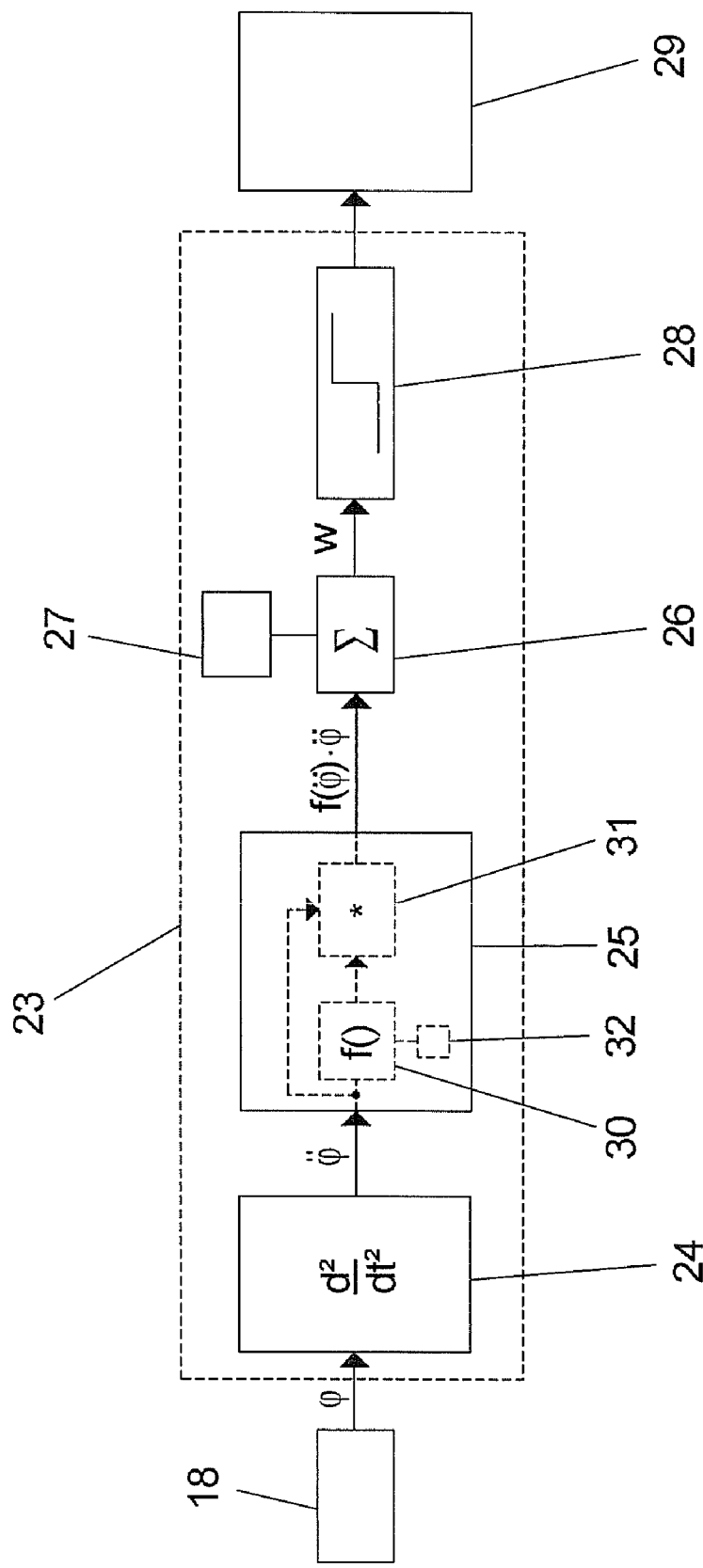
FIG. 4 is a variant of the analyzer according to FIG. 3.

FIG. 4 shows a variant of the analyzer 23, where the calculating unit 25 has a functional unit 30 describing a characteristic or a load profile and a multiplier 31. Aside from the calculating unit 25, the analyzer according to FIG. 4 has, however, a design identical to that of the analyzer according to FIG. 3. However, the threshold value transducer 28 may have a different or adapted threshold value.

The value $\ddot{\varphi}$ is sent to the functional unit 30, the functional unit 30 supplying as the output value the function value $f(\ddot{\varphi})$ as a function of the characteristic or the load profile. The output value $f(\dot\varphi)$ and the value are sent to the multiplier 31, which forms the product $f(\dot\varphi)\cdot\ddot\varphi$ and sends it to the summer 26. The product $f(\dot\varphi)\cdot\ddot\varphi$ forms especially a sign-free force signal or sign-free force data. In addition, the calculating unit 25 may have an absolute value former, which is arranged, e.g., downstream of the multiplier 31 or is arranged upstream of the functional unit 30 and/or the multiplier 31.

The characteristic or the load profile had preferably been determined in advance and is stored especially in a memory 32 of the calculating unit 25 or the functional unit 30.

While a specific embodiment of the invention has been shown and described in detail to illustrate the application of the principles of the invention, it will be understood that the invention may be embodied otherwise without departing from such principles.

LIST OF REFERENCE NUMBERS

1 Wheel carrier
2 Upper suspension arm
3 Lower suspension arm
4 Radius arm
5 Wheel suspension
6 Vehicle body
7 Motor vehicle
8 Ball and socket joint
9 Spherical joint
10 Ball and socket joint
11 Elastomer bearing
12 Balland socket joint
13 Elastomer bearing
14 Wheel
15 Wheel contact point
16 Road surface
17 Magnet
18 Magnetic field-sensitive sensor
19 Ball pivot
20 Ball and socket joint housing
21 Longitudinal axis of ball pivot
22 Longitudinal axis of joint housing
23 Analyzer
24 Double differentiator
25 Calculating unit
26 Summer or integrator
27 Memory of the summer or integrator
28 Threshold value transducer
29 Signal transmitter
30 Functional unit of calculating unit
31 Multiplier of calculating unit
32 Memory of calculating unit
$\varphi$ angle between ball pivot and joint housing, angle data
$\ddot\varphi$ Acceleration data
$|\ddot\varphi|$ Sign-free force data
$f(\dot\varphi)\cdot\ddot\varphi$ sign-free force data
w fatigue value, fatigue data

The invention claimed is:

1. A measuring device for a motor vehicle, the measuring device comprising:
    a bracket;
    a joint connected to said bracket, said joint having a joint housing and a pivot pin mounted movably in said joint housing;
    a vehicle component connected to said joint, said vehicle component being mounted pivotably on said bracket via said joint;
    an angle measuring device for determining an angle of said component in relation to said bracket;
    an analyzer connected to said angle measuring device, said analyzer having a double differentiator connected to said angle measuring device and a summer or integrator following said double differentiator via the intermediary of a calculating unit.

2. A measuring device in accordance with claim 1, further comprising: a threshold value transducer wherein said summer or integrator is followed by said threshold value transducer.

3. A measuring device in accordance with claim 2, further comprising: a signal transducer wherein said signal transducer is arranged downstream of said threshold value transducer and can be actuated by said threshold value transducer.

4. A measuring device in accordance with claim 1, wherein said summer or integrator has a memory.

5. A measuring device in accordance with claim 1, wherein said double differentiator, said calculating unit and said summer or integrator are comprised as digital assembly units or are formed by at least one digital computer.

6. A measuring device in accordance with claim 1, wherein a sampling frequency of said double differentiator is greater than a sampling frequency of said summer or integrator.

7. A measuring device in accordance with claim 1, wherein the component is formed by a control arm in a motor vehicle wheel suspension.

8. A measuring device in accordance with claim 1, wherein the bracket is formed from a motor vehicle body or from a motor vehicle wheel suspension.

9. A measuring device in accordance with claim 1, wherein said angle measuring device is integrated in said joint.

10. A measuring device in accordance with claim 1, wherein said calculating unit includes an absolute value former.

11. A measuring device in accordance with claim 1, wherein said calculating unit has a functional unit and a multiplier.

12. A process for determining a fatigue value characterizing the fatigue of a motor vehicle component mounted pivotably on a bracket, the process comprising:
    providing a joint connected to said bracket, said joint having a joint housing and a pivot pin mounted movably in said joint housing;
    providing the vehicle component connected to said joint so that said vehicle component is mounted pivotably on said bracket via said joint;
    providing an angle measuring device for determining an angle of said component in relation to said bracket;
    providing an analyzer connected to said angle measuring device;
    determining angle data by consecutive measurement of said angle between said component and said bracket;
    determining acceleration data by double differentiation of said angle data over time;
    determining sign-free force data on the basis of said acceleration data; and
    determining the fatigue value by summing up or integrating said sign-free force data over the time.

13. A process in accordance with claim 12, wherein said sign-free force data are determined by forming an absolute value from said acceleration data.

14. A process in accordance with claim 12, wherein a load profile is determined and the sign-free force data are determined on the basis of said load profile.

* * * * *